United States Patent
Debouk et al.

(10) Patent No.: US 9,740,178 B2
(45) Date of Patent: Aug. 22, 2017

(54) PRIMARY CONTROLLER DESIGNATION IN FAULT TOLERANT SYSTEMS

(71) Applicant: GM Global Technology Operations LLC, Detroit, MI (US)

(72) Inventors: Rami I. Debouk, Dearborn, MI (US); Stephen M. Baker, Oxford, MI (US); Jeffrey Joyce, North Vancouver (CA)

(73) Assignee: GM Global Technology Operations LLC, Detroit, MI (US)

( * ) Notice: Subject to any disclaimer, the term of this patent is extended or adjusted under 35 U.S.C. 154(b) by 935 days.

(21) Appl. No.: 13/803,290

(22) Filed: Mar. 14, 2013

(65) Prior Publication Data

US 2014/0277608 A1  Sep. 18, 2014

(51) Int. Cl.
  G05B 9/02  (2006.01)
  G05B 9/03  (2006.01)

(52) U.S. Cl.
  CPC .............. G05B 9/02 (2013.01); G05B 9/03 (2013.01); G05B 2219/24187 (2013.01); G05B 2219/24198 (2013.01); G05B 2219/24208 (2013.01)

(58) Field of Classification Search
  None
  See application file for complete search history.

(56) References Cited

U.S. PATENT DOCUMENTS 3,662,330 A * 5/1972 Meredith ............... G08G 1/097
                                                   340/933
4,634,110 A * 1/1987 Julich ..................... G06F 11/20
                                                   700/2

(Continued)

FOREIGN PATENT DOCUMENTS

CN      101458642 A    6/2009
EP        0433979 A2   6/1991
(Continued)

OTHER PUBLICATIONS

D. Essame et al., Available Fail-Safe Systems, Proceedings of the 6th IEEE Computer Society Workshop on Future Trends of Distributed Computing Systems (FTDCS '97), Tunis, Tunisia, Oct. 29-31, 1997. pp. 1-7.

*Primary Examiner* — Mohammad Ali
*Assistant Examiner* — Kelvin Booker
(74) *Attorney, Agent, or Firm* — Quinn IP Law

(57) ABSTRACT

A fault tolerant controller system includes a first controller and a second controller. One of the first and second controllers designated as a primary controller for generating control signals intended to control actuation devices on a vehicle under non-fault operating conditions, and the other of the first and second controllers designated as a secondary controller generating control signals intended to control actuation devices on the vehicle. The actuation devices are responsive only to the designated primary controller. An error is detected in the primary controller and a message is transmitted from the faulty controller to the non-faulty controller identifying the error. The non-faulty controller is subsequently designated as the primary controller. The control signals including an identifier that identifies the non-faulty controller as the designated primary controller. In response to detecting the error, the faulty controller is reset to operate in a safe operating mode as the secondary controller.

18 Claims, 2 Drawing Sheets

(56) References Cited

U.S. PATENT DOCUMENTS

| | | | | |
|---|---|---|---|---|
| 5,086,506 | A * | 2/1992 | Hall et al. | 455/8 |
| 5,117,501 | A * | 5/1992 | Childress et al. | 455/11.1 |
| 5,295,258 | A * | 3/1994 | Jewett et al. | 714/12 |
| 5,428,769 | A * | 6/1995 | Glaser | G05B 9/03 700/4 |
| 5,433,514 | A * | 7/1995 | Tsukamoto | B60T 8/175 303/113.2 |
| 5,502,812 | A | 3/1996 | Leyre et al. | |
| 5,646,845 | A * | 7/1997 | Gudat | B60K 31/0008 701/26 |
| 5,752,047 | A * | 5/1998 | Darty et al. | 713/300 |
| 5,802,266 | A * | 9/1998 | Kanekawa | G05B 9/03 714/11 |
| 6,061,600 | A * | 5/2000 | Ying | G05B 9/03 700/3 |
| 6,092,217 | A * | 7/2000 | Kanekawa | G05B 9/03 714/11 |
| 6,098,155 | A * | 8/2000 | Chong, Jr. | G06F 3/0613 714/11 |
| 6,345,368 | B1 * | 2/2002 | Bergsten | G06F 3/0619 714/11 |
| 6,550,018 | B1 * | 4/2003 | Abonamah | G06F 11/165 714/11 |
| 6,587,909 | B1 * | 7/2003 | Olarig et al. | 710/302 |
| 6,594,620 | B1 * | 7/2003 | Qin | G05B 9/02 702/183 |
| 6,732,979 | B1 * | 5/2004 | Kilner et al. | 244/236 |
| 6,823,251 | B1 * | 11/2004 | Giers | B60G 17/0185 303/122 |
| 6,868,309 | B1 | 3/2005 | Begelman | |
| 6,883,065 | B1 * | 4/2005 | Pittelkow | G06F 11/0727 709/206 |
| 6,988,221 | B2 | 1/2006 | Rasmussen | G05B 9/03 713/375 |
| 6,996,741 | B1 * | 2/2006 | Pittelkow | G06F 11/2092 714/11 |
| 7,003,688 | B1 * | 2/2006 | Pittelkow | G06F 11/2092 714/4.2 |
| 7,006,881 | B1 * | 2/2006 | Hoffberg | G05B 15/02 700/17 |
| 7,032,029 | B1 * | 4/2006 | Tanzman et al. | 709/245 |
| 7,043,663 | B1 * | 5/2006 | Pittelkow | G06F 11/2092 714/4.4 |
| 7,069,468 | B1 * | 6/2006 | Olson | G06F 11/2092 714/4.2 |
| 7,111,189 | B1 * | 9/2006 | Sicola | G06F 11/2092 714/15 |
| 7,127,633 | B1 * | 10/2006 | Olson | G06F 11/2092 714/4.4 |
| 7,401,254 | B2 * | 7/2008 | Davies | G06F 11/0709 714/11 |
| 7,840,963 | B2 * | 11/2010 | Traut | G06F 11/1438 711/161 |
| 9,195,232 | B1 * | 11/2015 | Egnor | G05D 1/0055 |
| 2002/0077782 | A1 * | 6/2002 | Fruehling | G06F 11/1008 702/185 |
| 2003/0037282 | A1 * | 2/2003 | Berg et al. | 714/11 |
| 2003/0127569 | A1 * | 7/2003 | Bacon et al. | 244/195 |
| 2004/0064519 | A1 * | 4/2004 | Kato | G06F 11/16 709/208 |
| 2004/0098140 | A1 * | 5/2004 | Hess | G05D 1/0077 700/3 |
| 2004/0158549 | A1 * | 8/2004 | Matena et al. | 707/1 |
| 2005/0115753 | A1 * | 6/2005 | Pemberton | G08G 1/164 180/167 |
| 2006/0085792 | A1 * | 4/2006 | Traut | 718/100 |
| 2006/0150003 | A1 * | 7/2006 | Abe | 714/11 |
| 2006/0236198 | A1 * | 10/2006 | Lintz et al. | 714/758 |
| 2007/0033195 | A1 * | 2/2007 | Stange et al. | 707/10 |
| 2007/0033435 | A1 * | 2/2007 | Stange et al. | 714/15 |
| 2007/0061735 | A1 * | 3/2007 | Hoffberg | G06F 9/4443 715/744 |
| 2007/0135975 | A1 * | 6/2007 | Stange et al. | 701/3 |
| 2008/0080985 | A1 * | 4/2008 | Gray | B60K 6/12 417/222.1 |
| 2008/0150713 | A1 * | 6/2008 | Kalhoff | H04L 12/403 340/532 |
| 2008/0264374 | A1 * | 10/2008 | Harris | E02F 9/20 123/179.3 |
| 2009/0180483 | A1 * | 7/2009 | Przybylski | 370/400 |
| 2009/0206841 | A1 * | 8/2009 | Weng | 324/426 |
| 2011/0066345 | A1 * | 3/2011 | Nasu | B60L 7/24 701/70 |
| 2011/0251739 | A1 * | 10/2011 | Tomas et al. | 701/3 |
| 2012/0028749 | A1 * | 2/2012 | Kawasaki | B60K 6/48 475/211 |
| 2012/0047406 | A1 * | 2/2012 | Nakatani et al. | 714/49 |
| 2012/0140861 | A1 | 6/2012 | Menon et al. | |
| 2012/0331339 | A1 * | 12/2012 | Schmidt et al. | 714/15 |
| 2013/0079894 | A1 * | 3/2013 | Kamenetz et al. | 700/4 |
| 2013/0090813 | A1 * | 4/2013 | Kanekawa | B62D 5/0481 701/43 |
| 2014/0257658 | A1 * | 9/2014 | Shimizu | B60T 8/17 701/70 |

FOREIGN PATENT DOCUMENTS

| | | |
|---|---|---|
| EP | 0433979 A3 | 6/1991 |
| EP | 0818000 B1 | 1/1998 |
| JP | H0764930 A | 3/1995 |
| WO | WO97/27541 | 7/1997 |

* cited by examiner

PRIMARY CONTROLLER DESIGNATION IN FAULT TOLERANT SYSTEMS

BACKGROUND OF INVENTION

An embodiment relates generally to fault control in fail-operational vehicle systems.

Systems which provide safety functions typically utilize redundant controllers to ensure that safe operation can be continued for a duration of time to allow the system to transition to a mode of operation that does not depend on the current state of the failed operational system. Such systems typically utilize dual duplex controllers. If a first controller fails and falls silent, a second controller will be activated and all actuators will switch over to rely on requests from the second controller. The system will function properly if the defect was something that was hardware in nature (e.g., wiring issue, pin connect issue), such that the second controller does not have the same defect. However, if the defect is due to a defect that is common to both controllers, such as a software defect, then this software defect causes a runtime error that both controllers are susceptible to. As a result, if both controllers become silent, then there are no operational controls that can be carried out in the system, and therefore the system will fail to operate.

SUMMARY OF INVENTION

An advantage of an embodiment is continued functionality of a system that utilizes duplex controllers, where functionality of system is maintained despite a failure in the system, such as a software design defect, which would otherwise affect both controllers thereby having no behavior responses from either controller. More so, the feasibility of starting either controller within microseconds provides a simple safe operating mode of operation which allows a control device operation to run as a separate application on bare hardware with minimal operating system support. The invention described herein combines the advantages of physical redundancy with an incremental fallback strategy with the overall goal of avoiding a condition in which the automation is unable to maintain a state of operation before the driver can be reasonably expected to take back control of the vehicle. The physical redundancy of this design primarily mitigates the risk of system failure due to random hardware faults. In addition, the incremental fallback from normal mode operation to safe mode operation primarily mitigates risk associated with systematic failures, e.g., software defect.

The invention utilizes the re-starting of the controller in safe operation mode after a failure, in which safe operation mode is a more deterministic behavior that is isolated from elements of normal mode operation where normal mode favors performance over deterministic behavior.

An embodiment contemplates a fault tolerant controller strategy for a fail-operational vehicle system. (a) providing a first controller and a second controller both generating control signals intended to control actuation devices on a vehicle under non-fault operating conditions, the first controller initially designated as a primary controller and the second controller initially designated as a secondary controller, the actuation devices being responsive only to the designated primary controller; (b) detecting an error in one of the two controllers, wherein the respective controller detected with the error is initially identified as a faulty controller and the other controller is initially identified as a non-faulty controller; (c) if a controller fault is detected in step (b), then generating control signals by the non-faulty designated primary controller for controlling actuation of the actuation devices, the control signals including an identifier that identifies the non-faulty controller as the designated primary controller; (d) in response to detecting the error in step (b), resetting the faulty controller to operate in a safe operating mode as the secondary controller.

An embodiment contemplates a fault tolerant controller system for a fail-operational vehicle system. A first controller generates control signals intended to control actuation devices on a vehicle under non-fault operating conditions. The first controller is initially designated as a primary controller. A second controller generates control signals intended to control the actuation devices on the vehicle. The second controller is initially designated as a secondary controller. The actuation devices are responsive only to the designated primary controller. When an error is detected in one of the two controllers, a message is transmitted from the faulty controller to the non-faulty controller identifying the error. The non-faulty controller is subsequently designated as the primary controller. Control signals generated by the non-faulty designated primary controller for controlling actuation of the actuation devices include an identifier that identifies the non-faulty controller as the designated primary controller. In response to detecting the error, the faulty controller is re-initialized to operate in a safe operating mode as the secondary controller.

DETAILED DESCRIPTION

Figure 1:
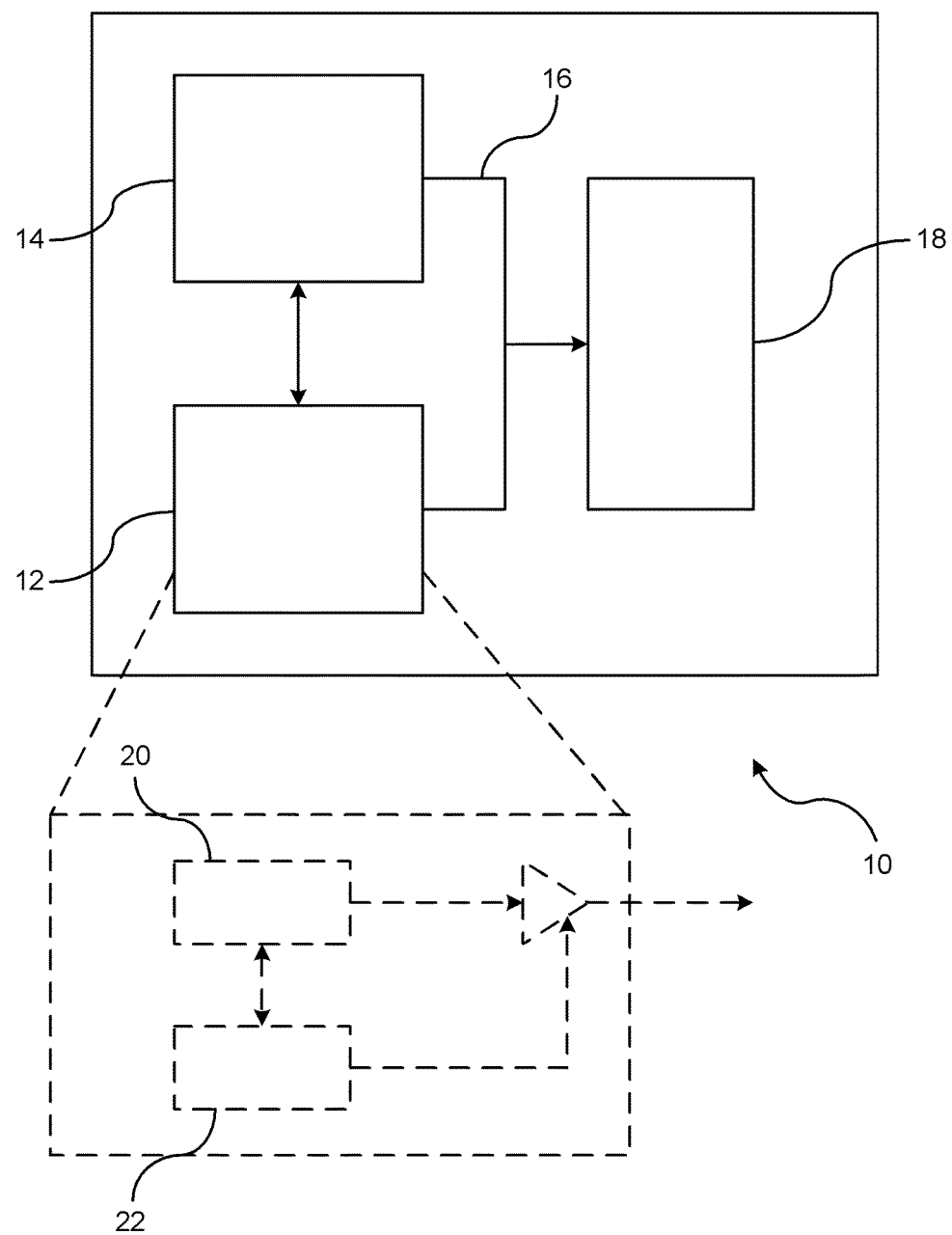
FIG. 1 is an architectural block diagram of a duplex controller for a vehicle fail-operational system.

There is shown in FIG. 1 an architectural block diagram of a duplex controller for a vehicle fail-operational system. Typically, vehicle systems utilize two controllers if the controlled system is one that utilizes autonomous controls or a safety-critical system, and therefore, requires fault-tolerant countermeasures if an error occurs within the system. The term autonomous controls or autonomous operation as used herein may refer to fully autonomous operations, semi-autonomous operations, or limited autonomous operations. Examples of such systems include, but are not limited to, autonomous driving systems such as adaptive cruise control systems and automated parking systems. In FIG. 1, a vehicle 10 is shown to include a first controller 12 and a second controller 14, a communication bus 16, and a vehicle device 18 (e.g., actuation device) for actuating a vehicle operation for preferably performing an automated operation that is controlled by the first controller 12 and the second controller 14.

The first controller 12 includes a first microprocessor 20 and a second microprocessor 22, preferably each having separate memory. The second controller 14 also includes two microprocessors (not shown). The first controller 12 and the second controller 14 each operating under non-failure operations (herein referred to as normal operating conditions) will both generate and transmit control signals as if each respective controller is controlling the vehicle device 18.

The control strategy for controlling the vehicle device 18 is based on a primary/secondary configuration such that one of the respective controllers is designated as the primary controller whereas the other controller is designated as the secondary controller. It should also be understood that the initial configuration of the system designating a respective controller as the primary controller is determined by the original equipment manufacturer and is set forth in the programming of the system. The vehicle device 18 will listen to and execute commands based only on control signals received from the designated primary controller. As a result, if the first controller 12 is designated as the primary controller and the second controller 14 is designated as the secondary controller, then the vehicle device 18 only executes functions based on the control signals generated and transmitted by the first controller 12. Although the second controller 14, designated as the secondary controller, generates and transmits control signals over the communication bus or similar communication link, the vehicle device 18 will not listen to the second controller while it is designated as the secondary controller.

The designation of the controllers as the primary controller or the secondary controller is determined by communications between the first controller 12 and the second controller 14. Initially, one of the respective controllers is designated as the primary controller (e.g., first controller 12). The first controller 12 communicates with the second controller 14 for indicating that it is functioning under normal conditions (without failure). The first controller 12, when communicating with the vehicle device 18, transmits a data packet that includes preamble portion followed by a message portion. The preamble portion includes an identifier (e.g., identification code) that identifies itself as the primary controller. The message portion includes control signals or other data. The vehicle device 18 associates the respective controller transmitting the identifier as the controlling device and will designate that respective controller as the designated primary controller. If a message is transmitted from a controller that does not include the identifier, then the message will be ignored by the control device 18.

If an error occurs that causes a failure condition with the designated primary controller, then the designated primary controller (e.g., first controller 12) communicates to the secondary controller (e.g., second controller 14) that an error has occurred in its operation and that it must reset itself. In response to the communication that an error has occurred, the secondary controller (e.g., second controller 14) will transmit as part of its message the identifier identifying itself as the designated primary controller. The control device 18 upon receiving the message containing the identification code from the second controller 14 will listen to and execute commands received by the second controller 14, which is now the designated primary controller. The transition between being the secondary controller to the primary controller is essentially transparent to the control device 18 since each controller is operating in a basically identical manner and that communication signals are being simultaneously generated on the communication bus by each respective controller. Therefore, since each controller, while operating under normal operating conditions, generates and communicates the same signals, the only change is which message the control device 18 listens to.

Figure 2:
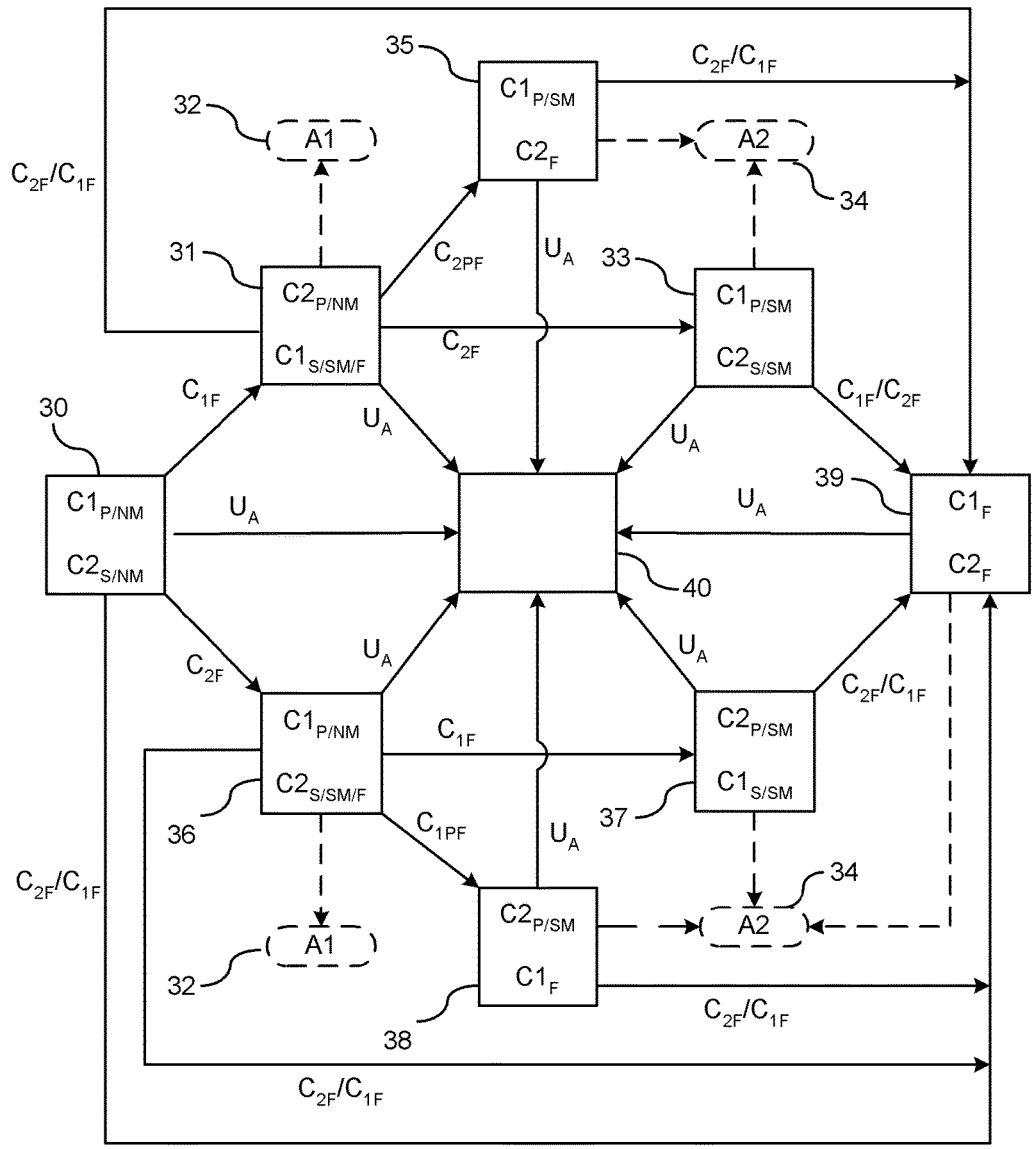
FIG. 2 is illustrates a flow diagram for designating primary and secondary controller functionality.

FIG. 2 illustrates a block diagram for a first failure condition for designating primary and secondary controller functionality. In block 30, both the first controller and the second controller are operating under normal operating conditions. In block 30, it has been previously determined that the first controller is designated as the primary controller and the second controller is designated as the secondary controller. The first controller identifies itself as the designated primary controller by transmitting an identifier in each message transmitted to the control device. The control device listens to and executes commands generated by the primary controller only. Though the secondary controller is generating and transmitting the same commands at approximately the same time, the control device ignores the commands from the second controller since the first controller is designated as the primary controller.

In block 31, a condition exists where a failure occurs with respect to operation with the primary controller (first controller). The first controller, in response to the occurrence of the failure, transmits a message to the second controller informing the second controller of the error that has occurred. If the first controller is capable of re-initializing (e.g., restarting), then a non-fatal error has occurred and the first controller will operate in safe operating mode; otherwise, if the first controller cannot re-initialize, then a fatal error is present and the first controller becomes unresponsive. In block 31, a non-fatal error occurs with respect to the first controller. The second controller in response to receiving the error message from the first controller designates itself as the primary controller ($C2_{P/NM}$). The second controller thereafter, while operating under normal operating conditions, designates itself as the subsequently primary controller. The first controller relinquishes its duties as the primary controller. Thereafter, the first controller will subsequently operate only in safe operating mode as the secondary controller ($C1_{S/SM}$) and will no longer transmit the identifier to the control device identifying itself as the primary controller.

It should also be understood that a fault in the faulty controller may be detected by the non-faulty controller by monitoring the activity of the faulty controller. Each controller may monitor the activity of the other controller for identifying a fault in the other controller. Detecting a fault in the faulty controller by the non-faulty controller may be identified in response to the faulty controller being non-responsive. That is, both controllers when operating in a normal operating mode generate identical control signals. Therefore, if no activity is being generated for a controller when control signals are being generated for the other controller, then a determination is made that the non-responsive controller is faulty.

Alternatively, a faulty controller may be identified in response to the faulty controller functioning erratically. If the faulty controller functions in a manner that deviates from its required behavior, then a determination may be made by the non-faulty controller monitoring the erratic functionality of the faulty controller.

In block 32, a first alert is actuated for alerting the driver of the vehicle of the failure condition. The first alert is not an urgent issue that requires immediate attention since the secondary controller is still operating in normal operating mode. The warning may be a visual warning that just notifies the driver that an error has been detected and the vehicle should be serviced in the near future should the error re-occur after one or more vehicle ignition restart operations. Such a warning may include a visual warning on the instrument panel.

In block 33, a condition exists where a non-fatal error occurs in second controller which is currently designated as the primary controller. The second controller, in response to the occurrence of the failure, transmits a message to the first controller notifying the first controller of the error that has occurred in its operation. In response to the error message, the first controller will subsequently function as the designated primary controller, but will operate only in safe operating mode ($C1_{P/SM}$). Operating in safe operating mode will allow the vehicle device to operate running as a separate application that functions on bare hardware with minimum operating system support. The second controller resets itself and subsequently operates in safe operating mode only ($C2_{S/SM}$) as the designated secondary controller.

In block 34, a second alert is actuated for alerting the driver of the vehicle of the failure condition in block 33. The second alert is more urgent relative to the first alert and requires the driver's immediate attention. The second alert indicates that a failure has occurred in both controllers. In such a situation, driver intervention should occur immediately. The second alert can either be a visual and/or audible alert that requires that the vehicle be serviced immediately and/or that the driver assume control of the vehicle operation.

If at any time the user performs a control action ($U_A$) to the vehicle, then such an action indicates that the user wants to take control of the vehicle 40. Each respective controller, whether operating in normal mode or safe operating mode, relinquishes control of the vehicle to the user. Such a control action is any action that is associated with or affects the control of the current vehicle operation controlled by the respective controllers. For example, if parallel parking is being autonomously executed by the respective controllers, then any action by the user to the steering wheel or the vehicle brakes is considered a control action ($U_A$) wherein the user desires to take control over the vehicle. Under such conditions, the autonomous operation being performed is terminated.

It should also be understood that upon a vehicle ignition start, sequence, each of the controllers are reset, and if each controller initializes normal operating mode with no errors, then the error message is disabled. The driver may re-activate the autonomous-controlled vehicle system (e.g., autonomous driving) at their option. An ignition start sequence is the vehicle ignition system being turned off for a predetermined period of time and then turned on again. The fail-operational system functions according to the technique described herein and will execute the program as set forth herein.

Block 35 represents a failure condition where a fatal error occurs in the second controller and the failure condition resulted in a permanent failure ($C2_F$). As a result, no communications are output from the second controller. The first controller functions as the primary controller; however, the first controller is only capable of functioning in safe operating mode ($C1_{S/NM}$) so long as a fatal error did not occur with the first controller in block 31. As a result of the fatal error in the second controller, there will be no designated secondary controller. Alternatively, if the fatal error occurred with respect to the first controller in block 31, and if a non-fatal error occurs in the second controller, then condition would exist similar to block 38.

Referring again to block 30, a second failure condition is illustrated for designating primary and secondary controller functionality. In block 30, both the first controller and the second controller are operating under normal operating conditions. In block 30, it has been previously determined that the first controller is designated as the primary controller ($C1_{P/NM}$) and the second controller is designated as the secondary controller ($C2_{S/NM}$). The first controller identifies itself as the designated primary controller by transmitting an identifier in each message transmitted to the control device. The control device listens to and executes commands generated by the primary controller only. Though the secondary controller is generating and transmitting the same commands at approximately the same time, the control device ignores the commands from the second controller since the first controller is designated as the primary controller.

In block 36, a condition exists where a failure occurs with respect to operation with the secondary controller (second controller). The second controller, in response to the occurrence of the failure, transmits a message to the first controller informing the first controller of the error that has occurred. If the second controller is capable of re-initializing (e.g., restarting), then a non-fatal error has occurred and the second controller will operate in safe operating mode; otherwise, if the second controller cannot re-initialize, then a fatal error is present and the second controller becomes unresponsive. In block 36, a non-fatal error occurs with respect to the second controller. The first controller in response to receiving the error message from the second controller continues to function as the primary controller ($C1_{P/NM}$). The first controller continues to transmit the identifier to the control device identifying itself as the primary controller.

In block 32, a first alert is actuated for alerting the driver of the vehicle of the failure condition that occurred in block 36. The first alert is not an urgent issue that requires immediate attention since the primary controller (first controller) is still operating in normal operating mode. The warning may be a visual warning that just notifies the driver that condition has occurred and the vehicle should be serviced in the near future. Such a warning may include a visual warning on the instrument panel.

In block 37, a condition exists where a non-fatal error occurs in the first controller which is currently designated as the primary controller. The first controller, in response to the occurrence of the failure, transmits a message to the second controller notifying the second controller of the error that has occurred in its operation. In response to the error message, the second controller will subsequently function as the designated primary controller, but will operate only in safe operating mode ($C2_{P/SM}$). Operating in safe operating mode will allow the vehicle device to operate running as a separate application that functions on bare hardware with minimum operating system support. The first controller resets itself and subsequently operates in safe operating mode only ($C1_{S/SM}$) as the designated secondary controller.

Block 38 represents a failure condition where a fatal error occurs in the first controller and the failure condition resulted in a permanent failure ($C1_F$). As a result, no communications are output from the first controller. The second controller functions as the primary controller, however, the second controller is only capable of functioning in safe operating mode ($C2_{S/NM}$). As a result of the permanent failure of the first controller, there will be no designated secondary controller. Alternatively, if the fatal error occurred with respect to the second controller in block 36, and if a non-fatal error occurs in the first controller, then a condition would exist similar to block 35.

If at any time the user performs a control action ($U_A$) to the vehicle, then such an action indicates that the user wants to take control of the vehicle, as illustrated in block 40. Each respective controller, whether operating in normal mode or safe operating mode, relinquishes control of the vehicle to the user. Such a control action is any action that is associated with or affects the control of the current vehicle operation controlled by the respective controllers. Under such conditions, the autonomous operation being performed is terminated.

In block 34, a second alert is actuated for alerting the driver of the vehicle of the failure condition in block 37 or 38. The second alert is more urgent that the first alert and requires the driver's immediate attention. The second alert indicates that a failure occurred in both controllers. In such a situation, driver intervention should occur immediately. The second alert can either be a visual and/or audible alert that requires that the driver assume control of the vehicle operation and/or that the vehicle be serviced immediately.

Referring again to block 30, a third failure condition is illustrated for designating primary and secondary controller functionality. In block 30, both controllers are operating in normal mode. In block 39, a condition exists where both the first controller and the second controller fail substantially simultaneously ($C1_F$, $C2_F$). If such a condition exists, then the second alert is actuated in block 34. The second alert is an urgent alert that requires the driver's immediate attention. A driver may assume control of the vehicle operation at any time regardless of whether the respective controllers are operating in normal mode or safe operating mode, as illustrated in block 40. The second alert indicates that both controllers have failed or that the controllers are operating in safe made. In such a situation, driver intervention should occur immediately. The second alert can either be a visual and/or audible alert that requires that the vehicle be serviced immediately and/or that the driver assume control of the vehicle operation. In addition, when both controllers have failed simultaneously, then the respective controller that is first to reset and begin operating in safe operating mode will be designated as the primary controller.

It should also be understood that in blocks 31, 33, 35, 36, 37, and 38, should a fatal error occur in both controllers ($C1_F$, $C2_F$), then the routine will proceed to block 39 where the condition signifies that both controllers are in a permanent failed state and cannot re-initialize. Whether a failure of both controllers occurs in sequence or simultaneously, this state indicates that there is no control by either controller and that the actuators may have their own strategy to act upon before the driver takes control of the operation. Whenever the routine enters block 39, then the second level alarm 34 is actuated for alerting the driver of the condition.

While certain embodiments of the present invention have been described in detail, those familiar with the art to which this invention relates will recognize various alternative designs and embodiments for practicing the invention as defined by the following claims.

What is claimed is:

1. A fault tolerant controller strategy for a fail-operational vehicle system comprising the steps of:
    (a) providing a first controller and a second controller both generating control signals intended to control actuation devices on a vehicle under non-fault operating conditions, the first controller initially designated as a primary controller and the second controller initially designated as a secondary controller, the actuation devices being responsive only to the designated primary controller;
    (b) detecting an error in one of the two controllers, wherein the respective controller detected with the error is initially identified as a faulty controller and the other controller is initially identified as a non-faulty controller, wherein detecting an error in one of the two controllers in step (b) includes self-detection of the error by the faulty controller;
    (c) if a controller error is detected in step (b), then generating control signals by the non-faulty designated primary controller for controlling actuation of the actuation devices, the control signals including an identifier that identifies the non-faulty controller as the designated primary controller;
    (d) in response to detecting the error in step (b), resetting the faulty controller to operate in a safe operating mode as the secondary controller, and actuating a first error message to a user alerting the user of the error detected in step (b); and
    (e) transmitting a message from the faulty controller to the non-faulty controller identifying the error in response to detecting the error in one of the two controllers, wherein the non-faulty controller is subsequently designated as the primary controller.

2. The fault tolerant controller strategy of claim 1 wherein if the first controller and second controller fail simultaneously, then the respective controller that re-initializes and begins operating in the safe operating mode is designated the primary controller.

3. The fault tolerant controller strategy of claim 1 wherein detecting an error in one of the two controllers in step (b) comprises the following steps:
    the first and second controller monitoring communication activity of one another; and
    identifying an error in the other controller in response to no communication activity from the other controller.

4. The fault tolerant controller strategy of claim 1 wherein detecting an error in one of the two controllers in step (b) comprises the following steps:
    the first and second controller monitoring communication activity of one another; and
    identifying an error in the other controller in response to the other controller deviating from an expected behavior.

5. The fault tolerant controller strategy of claim 1 wherein if the first controller and second controller fail permanently, then the actuation devices include a self-contained control strategy for maintaining operation until the user performs a control action for taking control of the autonomous vehicle system.

6. The fault tolerant controller strategy of claim 1 comprising the steps of:
    (f) if an error is subsequently detected in the non-faulty controller designated as the primary controller in step (e), then transmitting a message identifying the error from the designated primary controller to the secondary controller operating in the safe operating mode;
    (g) generating control signals by the secondary controller operating in the safe operating mode in response to the error detected in step (f), the control signals including an identifier that identifies the secondary controller operating in safe operating mode as the designated primary controller; and
    (h) actuating a second error message to the user in response to the error detected in step (f), wherein the second error message generated in response to the error detected in step (f) is of a greater urgency relative to the first error message generated in response to the error detected in step (b).

7. The fault tolerant controller strategy of claim 6 wherein the primary controller identified in step (f) operates in safe operating mode as succeeding designated secondary controller.

8. The fault tolerant controller strategy of claim 7 wherein the error message actuated in response to the error detected in step (f) signals to the user that user intervention should be performed for taking control of the control actuation device.

9. The fault tolerant controller strategy of claim 8 wherein control of the actuation devices by the first and second controllers are terminated in response to the user performing a control action for taking control of the actuation device.

10. The fault tolerant controller strategy of claim 6 wherein the first and second controllers are reset to a non-fault operating mode in response to an ignition start sequence, the ignition start sequence including turning off a vehicle ignition and the re-actuating the vehicle ignition.

11. The fault tolerant controller strategy of claim 6 wherein the safe operating mode operation includes operating the actuation devices using limited operating system support.

12. A fault tolerant controller system for a fail-operational vehicle system comprising:
   a first controller generating control signals intended to control actuation devices on a vehicle under non-fault operating conditions, the first controller initially designated as a primary controller;
   a second controller generating control signals intended to control the actuation devices on the vehicle, the second controller initially designated as a secondary controller, the actuation devices being responsive only to the designated primary controller;
   wherein when an error is detected in one of the two controllers, a message is transmitted from the faulty controller to the non-faulty controller identifying the error, and wherein the non-faulty controller is subsequently designated as the primary controller;
   wherein control signals generated by the non-faulty designated primary controller for controlling actuation of the actuation devices include an identifier that identifies the non-faulty controller as the designated primary controller;
   wherein in response to detecting the error, the faulty controller is re-initialized to operate in a safe operating mode as the secondary controller;
   wherein if an error is subsequently detected in the non-faulty controller designated as the primary controller, then transmitting a message identifying the error from the designated primary controller to the secondary controller operating currently in the safe operating mode, the primary controller identified as having an error is designated as a succeeding secondary controller operating in safe operating mode;
   wherein the secondary controller currently operating in the safe operating mode generates control signals that include an identifier identifying the secondary controller currently operating in safe operating mode as the designated primary controller; and
   wherein a second error message is actuated to the user after errors are detected in both the first and second controllers, and wherein the second error message generated in response to the error detected in first and second controllers is of greater urgency relative to the first error message generated in response to the error detected in one of the two controllers.

13. The fault tolerant controller system of claim 12 wherein a first error message is actuated for alerting a user of the error detected in one of the two controllers.

14. The fault tolerant controller system of claim 12 wherein if an error is subsequently detected in the designated primary controller operating in safe operating mode, then the succeeding secondary controller is designated as the succeeding designated primary controller operating in safe operating mode.

15. The fault tolerant controller system of claim 12 wherein the second error message indicates that user intervention should be performed for taking control of the actuation device.

16. The fault tolerant controller system of claim 12 wherein the first and second controllers relinquish vehicle controls to the user of the vehicle in response to the user performing a control action for taking control of the autonomous vehicle system.

17. The fault tolerant controller system of claim 12 further comprising an ignition system, wherein the first and second controllers are reset to a non-fault operating mode in response to an ignition start sequence, the ignition start sequence including turning off the vehicle ignition and the re-actuating the vehicle ignition.

18. The fault tolerant controller system of claim 12 wherein if the first controller and second controller fail simultaneously, then the respective controller re-initialized and operating in safe operating mode operation is designated the primary controller.

* * * * *